(12) United States Patent
Poppe et al.

(10) Patent No.: US 6,849,684 B2
(45) Date of Patent: Feb. 1, 2005

(54) MOLDED SOFT ELASTOMER/HARD POLYESTER COMPOSITION WITH NOISE DAMPING PROPERTIES

(75) Inventors: Ernst Poppe, Bernex (CH); Hans-Jurgen Huber, Usingen (DE); Ralf Hoffmann, Berlin (DE); Angelo Polese, Falkensee (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 248 days.

(21) Appl. No.: 09/982,438

(22) Filed: Oct. 18, 2001

(65) Prior Publication Data

US 2002/0128371 A1 Sep. 12, 2002

Related U.S. Application Data

(60) Provisional application No. 60/242,338, filed on Oct. 20, 2000.

(51) Int. Cl.[7] .............................................. C08L 51/00
(52) U.S. Cl. ....................... 524/539; 524/413; 524/494; 524/495
(58) Field of Search ................................. 524/500, 539, 524/494, 495, 413, 439

(56) References Cited

U.S. PATENT DOCUMENTS

| 4,981,908 A | 1/1991 | Wolfe, Jr. |
|---|---|---|
| 5,354,532 A | 10/1994 | Nakai et al. |
| 5,405,909 A | 4/1995 | Ohmae et al. |
| 5,731,380 A | 3/1998 | Golder |
| 5,814,696 A | 9/1998 | Saiki et al. |
| 5,824,421 A | 10/1998 | Kobayashi et al. |

FOREIGN PATENT DOCUMENTS

| DE | 2917941 A1 | 11/1980 |

OTHER PUBLICATIONS

Patent Abstract of Japan, Hibi Kenji, "Polybutylene Terephthalate Resin Composition", Publication No. 10095907, Publication Date Apr. 14, 1998.

*Primary Examiner*—Edward J. Cain

(57) ABSTRACT

The invention provides a molded composition having improved noise damping properties, made of a blend of a soft thermoplastic polyether elastomer and a hard polyester resin reinforced with a fibrous or particulate filler, the molded composition having an inhomogeneous structure comprising a surface part which is rich in elastomer and depleted in the polyester resin and the reinforcing filler compared to its inner part, obtained by monocomponent injection molding of a blend of the soft and the hard polyester resin wherein only the polyester resin contains the reinforcing particulate filler. The molded composition has a flex modulus Fm in the range 0.5 to 10 GPa, and maintains a sufficient minimum tan delta damping factor $t_{\_}$ over a temperature range of $-50°$ C. to $170°$ C.

16 Claims, 1 Drawing Sheet

MOLDED SOFT ELASTOMER/HARD POLYESTER COMPOSITION WITH NOISE DAMPING PROPERTIES

This application claims the benefit of U.S. Provisional Application No. 60/242,338, filed Oct. 20, 2000.

FIELD OF THE INVENTION

This invention relates to molded compositions having excellent vibration damping and noise suppression properties making them suitable for damping sound. The invention is particularly useful in damping sound generated by small electric motors in products such as automotive components and household appliances, for example sound generated by relay switches and fuse and relay boxes. The invention also relates to noise-damping components molded from such compositions, and to their method of manufacture.

BACKGROUND OF THE INVENTION

Polyester resins, such as polyethylene terephthalate (PET) and polybutylene terephthalate (PBT), and copolyether ester block copolymer elastomers have, for many years, been commonly used to form articles of all sizes and shapes. Each group of materials has its own advantages and drawbacks. More specifically, the PBT and PET polyester resins generally yield products having high rigidity and good resistance to many corrosive chemicals. In contrast, copolyether ester elastomers are renowned for their flexibility, resistance to fatigue and soft touch characteristics. Many mechanical and electrical components comprise pluralities of functional parts requiring a combination of such rigid and flexible materials.

Various vibration-damping polyester compositions are known. Resins that have good sound damping properties (measured as a high tan delta damping factor) generally have insufficient rigidity to be useful in many applications such as relay caps, fuse boxes, relay boxes or the like. Tan delta (or "dynamic loss tangent") is a measure of sound damping properties that is measured using a Dynamic Mechanical Analyzer which provides a quantification of a material's energy absorption expressed as a numerical value that is not associated with any units.

It has been proposed to blend a hard polyester resin with a soft elastomer having a high tan delta in order to produce molded parts that exhibit good sound damping properties. For example, JP-A 32 634 454 discloses a vibration damping polyester composition comprising a crystalline thermoplastic polyester, a polyester elastomer comprising polyester hard segments and polyether soft segments, and reinforcing fibers. However, as reported in U.S. Pat. No. 5,814,696, the foregoing composition undergoes a sharp reduction in rigidity due to the inclusion of the elastomer and cannot have a large vibration-damping because of the difficulty of increasing the amount of the elastomer to be added in practical use.

This U.S. Pat. No. 5,814,696 proposes to overcome the stated problem with a polyester resin composition having vibration-damping and noise suppression properties obtained by blending an aromatic polyester resin with a polyester block copolymer resin which consists essentially of polyester soft blocks and polyester hard blocks, optionally with a fibrous filler. This is said to achieve a product with a flexural modulus of at least 1,500 MPa using a polyester block copolymer resin that has a maximum value of the tan delta in a range of temperatures between −20° C. and +40° C., preferably between −15° C. and +20° C., without loss of rigidity.

It is known that copolyether ester elastomers maintain a tan delta damping factor over a wide temperature range, meaning that they exhibit good noise damping properties over this wide temperature range which is important for many end use applications. However, exploiting this property has been handicapped by the problems of associating this material with a more rigid material. The composite materials proposed so far are either limited in their range of temperature application, expensive to produce, or both. Generally speaking it can be said that the acoustic damping of these composite molded materials is a function of the inherent frequency of the material which is dependent on the E-modulus. This leads to limitation of the degree of damping, in particular under extreme acoustic conditions as encountered with relay caps.

Another approach to combining rigid polyester resins and flexible elastomers is the use of multicomponent thermoelastic elastomer compositions, for example a composition containing PET or PBT, an epoxy group containing ethylene copolymer, specific polyfunctional compounds and a block copolyether ester elastomer, as disclosed in U.S. Pat. No. 5,405,909.

Alternatively, it has been proposed to make parts like relay caps from two separate materials with greatly differing E-modulus. This is exemplified by U.S. Pat. No. 5,354,532 which proposes making composite molded articles having two discrete regions. One region is of a relatively highly rigid resin such as PET or PBT, the other region is of a relatively flexible copolyether ester elastomer, and the separate resins are molded to produce an interfacial bond. This produces bodies with a surface layer of the elastomer having good sound damping properties where most needed so as to provide better sound damping properties than is possible with parts made of one material. This is because vibrational energy is converted into heat in the flexible elastomer. However, co-molding of the separate components is relatively expensive and, as the soft component lays over the molded part, its poor temperature stability remains problematic.

In summary, there remains a need for a molded composition having excellent vibration damping and noise suppression properties over a wide range of temperatures and that can be manufactured inexpensively.

SUMMARY OF THE INVENTION

The invention provides a monocomponent-molded composition of a blend of a soft thermoplastic copolyether ester elastomer and a hard polyester resin reinforced with a fibrous or particulate filler, the molded composition having an inhomogeneous structure comprising an inner part and a surface part, the surface part being rich in elastomer and depleted in the polyester resin and the reinforcing filler compared to the inner part. The composition is obtained by monocomponent molding, usually injection molding, of a substantially homogeneous blend of the soft copolyether ester elastomer and the hard reinforced polyester resin wherein the elastomer has a flex modulus less than 0.1 GPa and a melting point in the range 155–200° C., the polyester resin has a flex modulus of at least 2.0 GPa and a melting point in the range 210–230° C., and only the polyester resin is reinforced with the particulate filler.

The resulting molded composition has a flexural modulus Fm in the range 0.5 to 10 GPa, usually from 1 to 8 GPa for bodies, and maintains a minimum tan delta damping factor $t_\_$ over a temperature range of −50° C. to 170° C. according to the formula:

$$t_\_ = -0.0159 \, \text{Ln}(Fm) + 0.0383.$$

Further characteristics of the invention are set out in the claims whose features may be combined with one another, and are further described in the following detailed description and Examples.

DETAILED DESCRIPTION OF THE INVENTION

Figure 1:
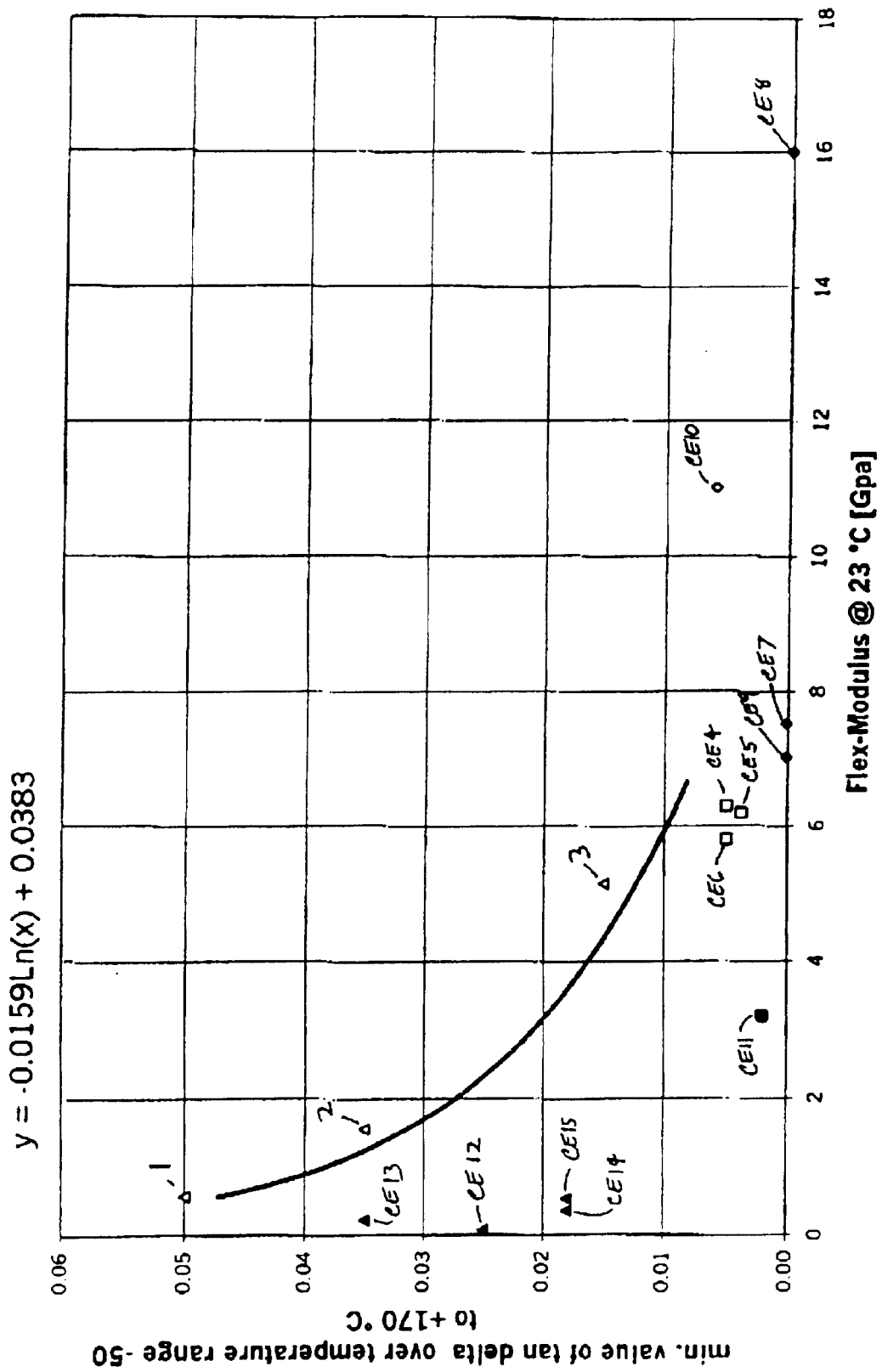
FIG. 1 is a graph showing the minimum value of the tan delta damping factor $t_\_$, measured over a temperature range of −50° C. to 170° C., as a function of the flex modulus of a series of tested materials, reported in the Examples described below.

The inhomogeneous structure of the molded composition according to the invention contains domains/layers of different density, modulus and reinforcing filler concentration. One domain is comprised primarily of a soft elastomer and the other domain is comprised of reinforced hard polyester resin containing soft elastomer. Though the structure is inhomogeneous, there is good bonding between the soft elastomer and the hard polyester resin as they were melted together, despite the fact that they have different melting points and viscosities. Inspection of the molded structure reveals a more-or-less uniform concentration of the reinforcing fibers in the middle inner region of the molded structure which is relatively enriched in the hard polyester, and a surface layer enriched with the elastomer which has segregated from the reinforced polyester/fibers.

This is contrary to conventional standard molding practices where it is usually sought to obtain a homogeneous final structure. In molding the composition of the invention, the soft elastomer and the hard polyester resin in the initial substantially homogeneous blend have a mismatch of melting point, viscosity and modulus so as to make possible the inhomogeneous structure, but the two polymers maintain sufficient compatibility to bond well together after melting.

Prior to molding, the reinforcing fibers are present only in one of the starting resins, namely in the hard polyester which has a higher melting point than the elastomer. During the molding step, the elastomer melts and begins to segregate towards the surface due to its lower melting point and to its lower viscosity at the molding temperature. At the same time, the reinforced polyester remains more solid and stays with the reinforcing fibers.

In the inner region of the molded body, the soft elastomer is enclosed in the reinforced polyester resin, hence improving its thermic stability. The reinforced middle inner region of the molded structure which is relatively enriched in the hard polyester also confers on the molded body an adequate rigidity.

The preferred copolyether ester elastomer generally consists essentially of a multiplicity of recurring long chain ester units and short chain ester units joined head-to-tail through ester linkages. The long chain ester units are represented by the formula

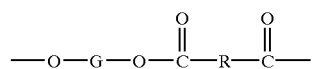

and the short chain ester units are represented by the formula

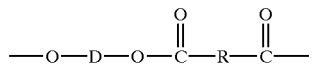

where G is a divalent radical remaining after removal of terminal hydroxyl groups from a poly(alkylene oxide) glycol having a molecular weight of about 400–6000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95% by weight of the copolyether ester.

Copolyether ester elastomers are described for example in U.S. Pat. Nos. 4,981,908, 5,824,421 and 5,731,380, the descriptions whereof are incorporated herein by way of reference. Copolyether ester block copolymers and their preparation are also described in Encyclopedia of Polymer Science and Engineering, Volume 12, pages 76–177 (1985) and the references reported therein. Various copolyether ester block copolymer elastomers are commercially available from a number of companies under various tradenames, for example HYTREL® of E.I. du Pont de Nemours and Company, RITEFLEX of Ticona and ARNITEL of DSM.

Varying the ratio hard/soft segment and using different alkylene oxides and molar weights of the soft segments makes it possible to obtain block copolyether ester elastomers having different hardnesses, for example mostly between Shore D 30 and 80. For this invention, preference will be given to the softer elastomers, e.g. with a hardness from Shore D 30 to 60.

Depending on the desired pattern of characteristics, persons skilled in the art will be able to select the copolyether ester block copolymer for the compositions according to the invention.

The hard polyester resin preferably belongs to a family of materials including PET and PBT. The hard polyester resin typically is comprised of a single polyester resin, preferably PBT, although a blend of more than one polyester resins is possible. The polyester resin itself must have a flex modulus of at least 2.0 GPa for the PBT polymer or 10 GPa for the reinforced product, and a melting point in the range 210–230° C. for PBT or up to 260° C. PET. As stated above, only the starting hard polyester resin contains the reinforcing particulate filler, this filler material and its amount being selected to reinforce the polyester resin, as desired.

The preferred compositions according to the invention typically comprise from 20 to 70 weight percent of copolyester ether elastomer and from 30 to 80 weight percent of the reinforced polyester resin, based on the total weight of the composition and, for most applications, contain from 30 to 60 weight percent of copolyether ester elastomer and from 40 to 70 weight percent of the reinforced single polyester resin. For molded bodies such as relay components, fuse boxes and relay boxes, very good sound damping has been obtained with compositions containing from 40 to 55 weight percent of copolyether ester elastomer and from 45 to 60 weight percent of the reinforced single polyester resin. Entirely satisfactory results have been obtained with about 50% of both components.

The filler is preferably fibrous, usually glass fibers, but can be other fibers such as carbon fibers, graphite fibers, aramid fibers, ceramic fibers, metal fibers, potassium titanate whiskers etc. The fibers usually have an aspect ratio of 10 to 1000.

The amount of the filler can vary widely depending on its size/nature, the relative proportions of the elastomer/reinforced polyester and the desired strength and properties of the final molded composition. Generally, the filler makes up between 5 and 60% by weight of the polyester, usually between 10 and 50%. Normally, the amount of the filler will correspond to between about 2.5% and 30% by weight of the total composition, usually between 5% and 20%. The amount of reinforcing filler should of course be sufficient to promote the segregation of the elastomer towards the surface. Without wishing to be bound by any theory, it is believed that sufficient reinforcing filler should be present to form, during initiation of the molding process, a reinforced matrix in which the polyester is retained but from which the elastomer, due to its lower melting point and its lower viscosity, is able to segregate.

The thickness of the elastomer-rich outside layer and its relative proportion of elastomer to polyester depends on the starting composition, the molding conditions and the shape and configuration of the body or layer produced. The outside layer is in any event noticeably richer in elastomer than the inner part, as has been established by visual inspection, by coloring the hard polyester resin with a pigment. This outer elastomer rich layer can be, and normally is, devoid of reinforcing filler.

Quantification of the internal and external zones of the molded composition is difficult on account of its inhomogeneous structure which can also vary depending on the configuration and dimensions of the molded body/layer. It can nevertheless be estimated that, starting with compositions containing from 40 to 55 weight percent of copolyester elastomer and from 45 to 60 weight percent of the reinforced polyester resin, molded structures having outer elastomer-rich layers containing 60–100% elastomer can be obtained. Such molded structures perform well in terms of sound damping properties.

The soft copolyether ester elastomer and/or the hard polyester may of course contain additives, for example stabilizers, dyes or pigments, fillers, flame retardants or processing aids such as release agents.

The molded composition according to the invention exhibits improved noise damping properties, due in particular to the surface part made of elastomer. These improved properties can be quantified in terms of maintaining a minimum tan delta damping factor $t\_$ over a wide temperature range. Specifically, the molded composition according to the invention maintains a tan delta damping factor over a temperature range of $-50°$ C. to $170°$ C. above a minimum value. This minimum tan delta damping factor is computed according to the given formula:

$$t\_ = -0.0159\ \text{Ln}(Fm) + 0.0383.$$

where Fm is the flexural modulus of the molded composition expressed in MPa.

Maintaining consistent sound damping over a wide temperature range means that the molded composition can be used in applications where it is subjected to large temperature differentials while maintaining adequate noise damping throughout the range. It also means that the same composition is suitable for a wide range of applications each requiring noise damping in different temperature spans within the overall range.

In addition to the advantages obtained by monocomponent molding, the resulting molded composition according to the invention has better noise absorbing properties than the same part molded by 2-component injection molding in which the inner wall is a soft elastomer and the outer wall is a hard polyester. It appears that the molecular structure of the outer elastomer-rich layer has improved properties for "destroying" energy, enhancing its noise damping capacity.

A main application of the molded compositions according to the invention is as noise-damping components, in particular of electrical apparatus, for example as relay components such as relay cases, relay bodies and relay switch caps as well as for fuse and relay boxes. Particular uses are as components of domestic electrical appliances, elevators, air-conditioning apparatus, and powertools.

Another particular application is as noise-damping components of vehicles, in particular automobile vehicles. Modern cars carry several hundred relays that are subjected to great temperature fluctuations. Relay caps produced according to the invention are able to keep a noise level below 50 dbA, over extreme temperature fluctuations, and so improve comfort in a passenger compartment.

EXAMPLES

The invention will be further described and compared to prior art practices in the following Examples. The examples are not, however, intended to limit the invention in any way. The tests hereinafter described were performed on samples obtained from compositions prepared in accordance with the Examples. Unless otherwise indicated, all parts and percentages are by weight based on total composition weight.

Materials used in the Examples set forth below are as follows, identified by the respective trademarks and trade designations, all these materials being available from E.I. du Pont de Nemours and Company:

TEEE-1: HYTREL 4068, a thermoplastic polyester elastomer consisting of a copolyether ester elastomer having a melt flow rate of 4.5 g/10 min at 220° C. under 2.16 kg load, a flexural modulus of 55 MPa at 23° C. and a melting point of 195° C.

TEEE-2: HYTREL G3548L, a thermoplastic polyester elastomer consisting of a copolyether ester elastomer having a melt flow rate of 10.0 g/10 min at 190° C. under 2.16 kg load, a flexural modulus of 32.4 MPa at 23° C. and a melting point of 156° C.

TEEE-3: HYTREL 4056, a thermoplastic polyester elastomer consisting of a copolyether ester elastomer having a melt flow rate of 5.3 g/10 min at 190° C. under 2.16 kg load, a flexural modulus of 62 MPa at 23° C. and a melting point of 150° C.

TEEE-4: HYTREL 5556, a thermoplastic polyester elastomer consisting of a copolyether ester elastomer having a melt flow rate of 7.5 g/10 min at 220° C. under 2.16 kg load, a flexural modulus of 207 MPa at 23° C. and a melting point of 203° C.

TEEE-5: HYTREL 6356, a thermoplastic polyester elastomer consisting of a copolyether ester elastomer having a melt flow rate of 8.5 g/10 min at 230° C. under 2.16 kg load, a flexural modulus of 330 MPa at 23° C. and a melting point of 211° C.

TEEE-6: HYTREL 7246, a thermoplastic polyester elastomer consisting of a copolyether ester elastomer having a melt flow rate of 12.5 g/10 min at 240° C. under 2.16 kg load, a flexural modulus of 570 MPa at 23° C. and a melting point of 218° C.

PBT-1: CRASTIN SK609BK851, a thermoplastic polyester based on polybutylene terephthalate (PBT) reinforced with 50% by weight of reinforcing glass fibers, having a tensile modulus of 1600 MPa at 23° C. and a melting point of 225° C.

PBT-2: CRASTIN SK603, a thermoplastic polyester based on polybutylene terephthalate (PBT) reinforced with 20% by weight of reinforcing glass fibers, having a tensile modulus of 7500 MPa at 23° C. and a melting point of 225° C.

PBT-3: CRASTIN SK609, a thermoplastic polyester based on polybutylene terephthalate (PBT) reinforced with 50% by weight of reinforcing glass fibers, having a tensile modulus of 16000 MPa at 23° C. and a melting point of 225° C.

PBT-4: CRASTIN LW9320, a thermoplastic polyester based on polybutylene terephthalate (PBT) containing SAN and reinforced with 20% by weight of reinforcing glass fibers, having a tensile modulus of 7500 MPa at 23° C. and a melting point of 220° C.

PBT-1 to PBT-4 are all fiber reinforced and have a flexural modulus above 10 GPa at 23°. The basic unreinforced PBT composition has a flexural modulus in the range 2000–2500 MPa.

PA 66-1: ZYTEL 70G25, a polyamide 66 containing 25% by weight of reinforcing glass fibers, conditioned by picking up about 2.5% by weight of moisture.

PA 66-2: ZYTEL 73G30T, a toughened polyamide 6 containing 30% by weight of reinforcing glass fibers, conditioned by picking up about 2.5% by weight of moisture.

PA 66-3: ZYTEL 80G33, a supertough polyamide 66 containing 33% by weight of reinforcing glass fibers.

PET-1: RYNITE 531F, a thermoplastic polyester based on polyethylene terephthalate (PET) reinforced with 30% by weight of reinforcing glass fibers.

POM-1: DELRIN 500, a polyoxymethylene which is a POM homopolymer obtained by the polymerization of formaldehyde.

Table I shows the compositions of Examples 1 to 3 according to the invention and those of Comparative Examples CE 4 to CE 15. In addition, Table I shows the corresponding measured minimum value of the tan delta damping factor t__, over the temperature range −50° C. to 170° C., and the flexural modulus (MPa) (also referred to as "flex" modulus) measured according to ISO 128.

The compositions of Examples 1 to 3 shown in Table 1 were prepared by mixing the components in the indicated proportions and melt blending the resulting mixtures on a 40 mm diameter single screw injection unit using standard conditions, to produce a homogeneous blend. During blending the temperature profile of the barrel was from 230° C. at the hopper to 250° at the metering zone, and the screw speed was 100 rpm. Measured melt temperatures ranged from 230° C. to 260° C. for the various compositions. The amount 15%, 25% or 35% by weight of fibers in the total composition of Examples 1 to 3 comes from the fact that PBT-1 contains 50% by weight of glass fibers. These compositions, and also the materials of Comparative Examples CE4 to CE18, were injection-molded to form molded bodies in the form of caps for relay switches, using the molding conditions as follows: melt temperature 230° C.–295° C., mold temperature 40–80° C., hold pressure 70–120 MPa, total cycle time 15 to 25 seconds.

The entire series of relay caps were subjected to a series of tests to measure the noise absorbing properties at different temperatures over a wide frequency range. The tan delta damping factor t__ was continuously measured over a temperature range of −50° C. to 170° C., in order to determine the minimum value of the tan delta in this range, using a Dynamic Mechanical Analyzer (DMA). The tan delta damping factor provides a measurement of energy absorption and the purpose of this measurement is to establish if the material has poor sound damping properties in any given temperature span which would lead to poor sound damping if the component were subjected to such temperatures in use.

TABLE I

| Example | Composition | Min t__ | Flex Modulus (GPa) |
| --- | --- | --- | --- |
| EX 1 | 70% TEEE 1; 30% PBT 1 (containing 15% fibers) | 0.05000 | 0.57 |
| EX 2 | 50% TEEE 1; 50% PBT 1 (containing 25% fibers) | 0.03500 | 1.54 |
| EX 3 | 30% TEEE 1; 70% PBT 1 (containing 35% fibers) | 0.01500 | 5.14 |
| CE 4 | PA 66-1 | 0.00500 | 6.30 |
| CE 5 | PA 66-2 | 0.00380 | 6.20 |
| CE 6 | PA 66-3 | 0.00500 | 5.80 |
| CE 7 | PBT-2 | 0.00010 | 7.50 |
| CE 8 | PBT-3 | 0.00006 | 16.0 |
| CE 9 | PBT-4 | 0.00010 | 7.00 |
| CE 10 | PET-1 | 0.00600 | 11.0 |
| CE 11 | POM-1 | 0.00200 | 3.20 |
| CE 12 | TEEE-3 | 0.02500 | 0.06 |
| CE 13 | TEEE-4 | 0.03500 | 0.21 |
| CE 14 | TEEE-5 | 0.01800 | 0.34 |
| CE 15 | TEEE-6 | 0.01800 | 0.52 |

The values of the tan delta damping factor t__ indicated in Table I are plotted by example number in FIG. 1 as a function of the measured flex modulus of the series of tested materials.

Table II shows the measurement of a series of property parameters measured on the molded compositions of Examples 1 to 3, indicating the average value and standard deviation.

TABLE II

| | Tensile E-Modulus [MPa] | | Tensile Strength [MPa] | | Elongation [%] | | Chary notched [KJ/m$^2$] | |
| --- | --- | --- | --- | --- | --- | --- | --- | --- |
| Example | Average | STD DEV. | Average | STD DEV. | Average | STD DEV. | Average | STD DEV. |
| Ex 1 | 570 | 43 | 25 | 0.5 | 48 | 3.1 | 33.2 | 1.0 |
| Ex 2 | 1540 | 93 | 43 | 0.5 | 23 | 1.0 | 35.2 | 1.4 |
| Ex 3 | 5140 | 150 | 74 | 1.3 | 9 | 0.5 | 28.9 | 1.2 |

The tensile E-modulus (MPa), tensile strength (MPa) and Elongation at Break (%) were measured according to ISO 527-1 and the Charpy notched impact strength (KJ/m$^2$) was measured at 23° C. according to ISO 170 IcA. Note that a tensile E-modulus above about 1000 MPa (i.e. as for Examples 2 and 3) is preferred for some applications like relay caps. A flex modulus above about 1000 Mpa is also preferred for such applications. Note that the flex modulus has a value close to that of the tensile E-modulus (within about 10% of the value). For Examples 1, 2, and 3, the measured flex modulus and tensile E-modulus have identical values, as indicated in Tables I and II.

The logarithmic curve on FIG. 1 is plotted according to the function $t\_=-0.0159\ Ln(Fm)+0.0383$. The Examples according to the invention are all above this curve, and the Comparative Examples are all below this curve, mostly well below. As can be seen from the graph, the tan delta damping factor $t\_$ decreases generally logarithmically with increasing flex modulus. This curve illustrates that for specimens with a flex modulus from 0.5 to about 6 GPa (extrapolated to 10 GPa), the molded compositions according to the invention consistently exhibit a higher value of the minimum tan delta damping factor $t\_$ measured over the temperature range from −50° C. to 170° C., in contrast to the Comparative Examples.

It can be seen that Comparative Examples CE12–CE15, which are composed of elastomer only, have high minimum values of the tan delta damping factor $t\_$, but an extremely low flex-modulus, making them totally unsuitable for molding into relay caps, fuse boxes or similar bodies.

On the other hand, Comparative Examples CE4–CE10 all display an flex-modulus from about 6 GPa up to 16 GPa (for CE8) making them suitable for molding into relay cap bodies or similar relatively rigid bodies, but they display very low minimum values of the tan delta damping factor $t\_$ over the temperature range under consideration, meaning that they are inadequate for noise damping applications over the given range. CE11 combines a low flex-modulus of 3.2 GPa with very low tan delta damping factor $t\_$.

It is clear from these Examples that, especially for molded compositions with a flex-modulus in the range 0.5 to 6 GPa, the invention provides an outstanding combination of physical properties that could not be achieved in the prior art.

Modified Examples

When Examples 1 to 3 are repeated substituting TEEE-1 with TEEE-2 or TEEE-3, i.e. both of which have a melting point below 200° C. and a flexural modulus less than 0.1 GPa, good results are obtained.

However, repeating Examples 1 to 3 but substituting TEEE-1 with TEEE-4, TEEE-5 or TEEE-6, i.e. all of which have a melting point above 200° C. and a flexural modulus greater than 0.1 GPa, poor results are obtained, in particular due to inadequate segregation of the elastomer.

What is claimed is:

1. A monocomponent-molded composition of a blend consisting essentially of a soft thermoplastic copolyether ester elastomer and a hard polyester resin reinforced with a fibrous or particulate filler, the molded composition having an inhomogeneous structure comprising an inner part and a surface part, the surface part being rich in the elastomer and poor in the polyester resin and the reinforcing filler compared to the inner part, said composition being obtained by monocomponent molding of a blend consisting essentially of the elastomer and the hard polyester resin wherein the elastomer comprises 20 to 70 weight percent of the total composition and has a flex modulus less than 0.1 GPa and a melting point in the range 155–200° C., the hard polyester resin has a flex modulus of at least 2.0 GPa and a melting point in the range 210–230° C., and only the hard polyester resin is reinforced with the particulate filler.

2. The molded composition of claim 1 which has a flex modulus Fm in the range 0.5 to 10 GPa.

3. The molded composition of claim 2 which has a flex modulus Fm in the range 1 to 8 GPa.

4. The molded composition of claim 1 which maintains a minimum tan delta damping factor $t\_$ over a temperature range of −50° C. to 170° C. according to the formula:

$$t\_=-0.0159\ Ln(Fm)+0.0383.$$

5. The molded composition of claim 1 wherein the copolyether ester elastomer consists essentially of a multiplicity of recurring long chain ester units and short chain ester units joined head-to-tail through ester linkages, said long chain ester units being represented by the formula

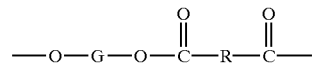

and said short chain ester units being represented by the formula

where G is a divalent radical remaining after removal of terminal hydroxyl groups from a poly(alkylene oxide) glycol having a molecular weight of about 400–6000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95% by weight of said copolyether ester.

6. The molded composition of claim 1 wherein the hard polyester resin is polybutylene terephthalate.

7. The molded composition of claim 1, comprising from 30 to 60 weight percent of copolyether ester elastomer, and from 40 to 70 weight percent of the reinforced polyester resin, based on the total weight of the composition.

8. The molded composition of claim 1, wherein the filler makes up between 5 and 50% by weight of the reinforced polyester resin, and between 2.5% and 30% of the total.

9. The molded composition of claim 1 which is a noise-damping component.

10. The molded composition of claim 9 which is a component of an electrical apparatus.

11. The molded composition of claim 10 which is a relay component or a fuse box.

12. The molded composition of claim 9 which is a component of a domestic electrical appliance, an elevator an air-conditioning apparatus or a powertool.

13. The molded composition of claim 1 which is a noise-damping component of a vehicle.

14. A method of producing a molded composition of a blend consisting essentially of a soft thermoplastic copolyether ester elastomer and a hard polyester resin reinforced with a fibrous or particulate filler, the method comprising monocomponent molding of a blend comprising the elastomer and the hard polyester resin wherein the elastomer comprisies 20 to 70 weight percent of the total composition and has a flex modulus less than 0.1 GPa and a melting point in the range 155–200° C., the hard polyester resin has a flex modulus of at least 2.0 GPa and a melting point in the range 210–230° C., and only the polyester resin is reinforced with the particulate filler, to produce a molded composition having an inhomogeneous structure comprising an inner part and a surface part, the surface part being rich in the elastomer and poor in the polyester resin and the reinforcing filler compared to the inner part.

15. The method of claim 14, wherein the resulting molded composition has a flex modulus Fm in the range 0.5 to 10 GPa.

16. The method of claim 14, wherein the resulting molded composition maintains a minimum tan delta damping factor $t_{\_}$ over a temperature range of $-50°$ C. to $170°$ C. according to the formula:

$$t_{\_} = -0.1059 \ Ln(Fm) + 0.0383.$$

* * * * *